_3,130,060_
CONFECTIONERS' MOLDING STARCH
James W. Evans, Highland, Ind., assignor to American Maize-Products Company, a corporation of Maine
No Drawing. Filed Sept. 2, 1960, Ser. No. 53,637
7 Claims. (Cl. 106—38.5)

This invention relates to an improved confectioners' molding starch.

In the manufacture of semi-solid confectionery products such as jelly beans, gum drops, nougats, cream fondants and the like, the hot liquid confectionery composition is poured into a mold cavity formed by pressing a male die of the desired mold shape into a tray of powdered starch. As the composition cools it releases water to the starch which in turn releases the water to the atmosphere. The combination of cooling and transfer of water finally results in setting up the liquid composition as a semi-solid confectionery product. Since powdered starch is free-flowing material which by itself cannot hold the shape of the mold cavity, some form of binder is added to the starch to give it the required cohesiveness and plastic molding characteristics. Heretofore, animal and vegetable fats and oils have been employed as binders for the starch but these have not been entirely satisfactory since the fats are solid materials at the temperatures usually encountered in commercial confectionery processes and therefore when the fats are added to the starch in small amounts they do not provide the oily lubricity which is essential for good molding characteristics. When a higher proportion of fat is added, sufficient to achieve the required lubricity, the fat globules block water transfer from the confectionery composition to the starch and from the starch into the atmosphere so that the setting time of the confection is objectionably extended. Also, the fats tend to become rancid as the molding starch is reused over a prolonged period of time. While fatty oils in small amounts do provide better lubricity than the solid fats, the oils soon become rancid and tend to inhibit water transfer from the liquid confectionery product.

For these reasons it has been suggested that mineral oil be used as a binder for the molding starch. While the mineral oil does not in and of itself become rancid, it is objectionable in certain other respects. First of all, a fresh batch of the starch-mineral oil mixture does not have satisfactory molding characteristics. It is only after the mixture has been used for an extended period of time during which the mineral oil gradually absorbs small quantities of fats, sugar and other residues from the confectionery composition that good molding characteristics are developed. Because of this a fresh mineral oil-starch mixture is never used alone. The fresh mixture is always added in small controlled amounts as make up to a used mineral oil-starch mixture which already has good molding characteristics. The addition of make up starch has to be balanced against the tendency of the batch to become stale or rancid in order to maintain satisfactory molding characteristics. Also, the mineral oil has no nutritive value so that when small quantities are absorbed into the confectionery product, the nutritive value of the product is diluted.

We have now found that aliphatic organic esters of saturated higher fatty acids can be admixed in very small amounts with powdered starch to form a confectioners' molding starch which has excellent molding characteristics right from the time that it is first prepared. The saturated fatty acid ester is edible and highly nutritive so that small amounts absorbed by the confectionery product will enhance the nutritive value of the product. The saturated fatty acid ester permits rapid transfer of water from the hot liquid confectionery composition to the starch and from the starch to the atmosphere so that the setting time of the confectionery product is as good and at times better than that obtained in current commercial operations. Preferably the fatty acid esters employed are those which melt at temperatures of about 160° F. or lower. Since the temperatures of the liquid confectionery composition poured into the starch mold cavity is about 100 to 200° F., the selected saturated fatty acid ester remains in substantially liquid form and it retains its oily lubricity over the entire cooling period.

We have also found that separation of the starch from the final confectionery product is materially enhanced by use of the saturated fatty acid esters. In conventional processes after the confectionery composition has set into its final form the starch is initially separated from the products by screening. Thereafter a brushing operation with stiff wire bristles is necessary to remove starch particles which remain embedded in the skin of the confectionery products as a result of poor separation between the conventional binders and the confectionery composition. With the fatty acid ester binders of this invention complete separation may be achieved immediately after the screening operation alone and brushing time of the confectionery product is either entirely eliminated or very substantially reduced. Reduction of brushing time is of advantage to reduce time of manufacture and increase through put. The fatty acid ester does not become rancid after prolonged use so that the original starch-fatty acid mixture may be satisfactorily used over and over again.

The fatty acid esters which may be used in accordance with this invention are esters of aliphatic monohydric organic alcohols and saturated fatty acids having from eight to eighteen carbon atoms in the chain. For example the methyl, ethyl, propyl, isopropyl, butyl, amyl, hexyl, heptyl, octyl, cyclohexyl, and lauryl esters of caprylic, capric, lauric, myristic, palmitic, margaric and stearic acids may be used. All of these esters have melting points lower than 160° F. and all of these esters are edible and have nutritive value. We have achieved excellent results with ethyl stearate which melts at about 102° F.

Only very small amounts of the fatty acid esters are required and we prefer to add about 0.1% fatty acid ester by weight based on the weight of the starch. Higher amounts can be employed but this does not give any added special advantages and is not actually necessary. Even trace amounts of the fatty acid ester will impart plastic molding characteristics to the starch. In general about 0.05% to about 0.5% fatty acid ester by weight of the starch may be employed.

The fatty acid ester is mixed with the powdered starch in conventional equipment currently employed by confectioners. If the ester is a liquid at ordinary atmospheric temperatures the ester is merely sprayed into the starch while the starch is agitated so that the two materials are thoroughly mixed together. If the fatty acid ester is a solid at room temperatures then it is first liquefied by heating and sprayed and mixed into the starch in the same manner to form an intimate admixture. Usually the starch will lose its dusty free-flowing characteristics a few minutes after the fatty acid ester is mixed in and thereafter the starch has excellent molding characteristics and may be immediately employed as a confectioners' molding starch.

As to the starch any form of commercially available starch may be employed. For example starch derived from corn, potato, wheat, sago, and arrowroot may be employed. Also, modified starches such as the commercially available family of oxidized starches, ether starches, anionic and cationic starches, acid treated thin boiling starches and dextrinized starches may be employed. The starch is preferably in a finely divided granular form and we have achieved excellent results with powdered corn starch.

The acid treated thin boiling starches mentioned above are conventional in the art and are produced commercially by suspending starch in a dilute acid solution at a temperature below that of gelatinization of the starch in order to reduce the paste viscosity of the starch by limited acid degradation. The reaction may be carried out to any desired degree until the modification of viscosity has been achieved to the extent desired. The reaction is discontinued by neutralizing the suspension by addition of a base or by any other conventional means. The products which can be obtained with this treatment may have a paste viscosity slightly below that of the untreated starch or low enough to be almost in the range of an acid modified dextrin.

In the foregoing description of my invention I have described various materials that may be used and their equivalents, and ranges, limits and conditions within which my invention may be produced. In the following examples I set forth the best mode contemplated by me of carrying out my invention but it is to be understood that these examples are not to be taken as limiting my invention.

*Example 1*

1000 grams of starch were placed in a Hobart mixer and one gram of ethyl stearate, heated into a liquid form, was sprayed in as the starch was agitated. After a few minutes the starch lost its dusty free-flowing characteristics and became an excellent confectioners' molding starch.

*Example 2*

2000 pounds of regular corn starch were introduced into a commercial dextrine cooker and two pounds of liquefied ethyl stearate was sprayed in while the starch was being agitated. After a few minutes the starch developed good molding characteristics.

*Example 3*

1000 grams of starch were placed in a Hobart mixer and one gram of butyl stearate was sprayed in. The two materials were thoroughly and intimately admixed after which the starch had excellent molding characteristics.

*Example 4*

1500 grams of acid treated thin boiling corn starch is placed in a Hobart mixer. One gram of methyl palmitate is sprayed in while the starch is being agitated. After a few minutes the starch loses its dusty free-flowing characteristics and develops into a cohesive plastic confectionery molding starch.

*Example 5*

1000 grams of potato starch is placed in a mixer having a propeller type agitator blade. One gram of butyl myristate is sprayed in during agitation of the starch. Within a few minutes the starch changes from a free-flowing powder into a plastic starch molding composition.

It will be understood that it is intended to cover all changes and modifications of the preferred embodiment of the invention herein chosen for the purposes of illustration which do not depart from the spirit and scope of the invention.

I claim:

1. A starch molding composition for use in the manufacture of confectionery products consisting essentially of an edible non-toxic admixture of starch and an ester of an aliphatic monohydric alcohol having from 1 to 12 carbon atoms and a saturated fatty acid having from 8 to 18 carbon atoms, the amount of said ester being from about 0.05% to about 0.5% by weight based on the weight of the starch.

2. A starch molding composition for use in the manufacture of confectionery products consisting essentially of a non-toxic edible admixture of starch and an ester of an aliphatic monohydric alcohol having from 1 to 12 carbon atoms and a saturated fatty acid having from 8 to 18 carbon atoms, said ester having a maximum melting point of about 160° F. and the amount of said ester being from about 0.05% to about 0.5% by weight based on the weight of the starch.

3. A starch molding compoistion for use in the manufacture of confectionery products consisting essentially of a non-toxic edible intimate admixture of powdered starch and a liquid ester of an aliphatic monohydric alcohol and a saturated fatty acid having from 8 to 18 carbon atoms, the amount of said ester being from about 0.05% to about 0.5% by weight based on the weight of the starch.

4. A composition in accordance with claim 3 in which the ester is ethyl stearate.

5. A composition in accordance with claim 3 in which the starch is powdered corn starch.

6. A starch molding composition for use in the manufacture of confectionery products consisting essentially of a non-toxic edible admixture of powdered acid treated thin boiling corn starch and about 0.1% by weight of the starch of ethyl stearate in liquid form, said ethyl stearate being substantially uniformly dispersed throughout the corn starch particles.

7. The method of manufacturing a semi-solid confectionery which comprises the steps of mixing starch with from about 0.05% to about 0.5% by weight of an ester of an aliphatic monohydric alcohol having from 1 to 12 carbon atoms and a saturated fatty acid having from 8 to 18 carbon atoms, forming a mold with such starch and then pouring a hot liquid confectionery into the mold and maintaining the liquid confectionery in the mold until it cools to a semi-solid state.

References Cited in the file of this patent

UNITED STATES PATENTS

| | | |
|---|---|---|
| 1,074,600 | Breyer | Oct. 7, 1913 |
| 2,513,638 | Glabe | July 4, 1950 |
| 2,666,038 | Eisen | Jan. 12, 1954 |

FOREIGN PATENTS

| | | |
|---|---|---|
| 431,275 | Great Britain | July 4, 1935 |

OTHER REFERENCES

Warth: "The Chemistry and Technology of Waxes," pub. 1956 by Reinhold, N.Y.C. (pages 63–68, 444, 547–8, 587). Copy in Sci. Lib.